United States Patent [19]
Cappel

[11] 4,385,524
[45] May 31, 1983

[54] COMPACT SHAKE MECHANISM

[75] Inventor: Klaus L. Cappel, Madison, Ala.

[73] Assignee: Wyle Laboratories, El Segundo, Calif.

[21] Appl. No.: 310,800

[22] Filed: Oct. 13, 1981

[51] Int. Cl.³ .......................... B06B 3/00; B04B 5/10; F16H 25/16

[52] U.S. Cl. ...................................... 73/663; 74/99 R

[58] Field of Search ......................... 73/663, 667, 672; 181/121; 74/99 R, 99 A; 233/1 R Primary Examiner—Howard A. Birmiel
Attorney, Agent, or Firm—Freilich, Hornbaker, Wasserman, Rosen & Fernandez

[57] ABSTRACT

A mechanism is provided for oscillating a shake table or other member at high accelerations but over short distances. The mechanism includes a group of pad devices supporting the shake table on a base, with each pad device including upper and lower curved pads respectively received in sockets of the table and base and with the pads able to slide on one another. However, the centers of curvature of the two pads are spaced from one another, so that when a driver rotates the lower pad in its socket, causing the upper pad to rotate in its corresponding socket and slide on the lower pad, the upper pad is displaced vertically by a slight amount. Thus, an actuating device that applies a moderate force to the lower pad to rotate it, therefor applies a much greater vertical force to the table, to accelerate it at a high level. The pad devices also can support a large static loading on the table as where it lies in a centrifuge.

7 Claims, 9 Drawing Figures

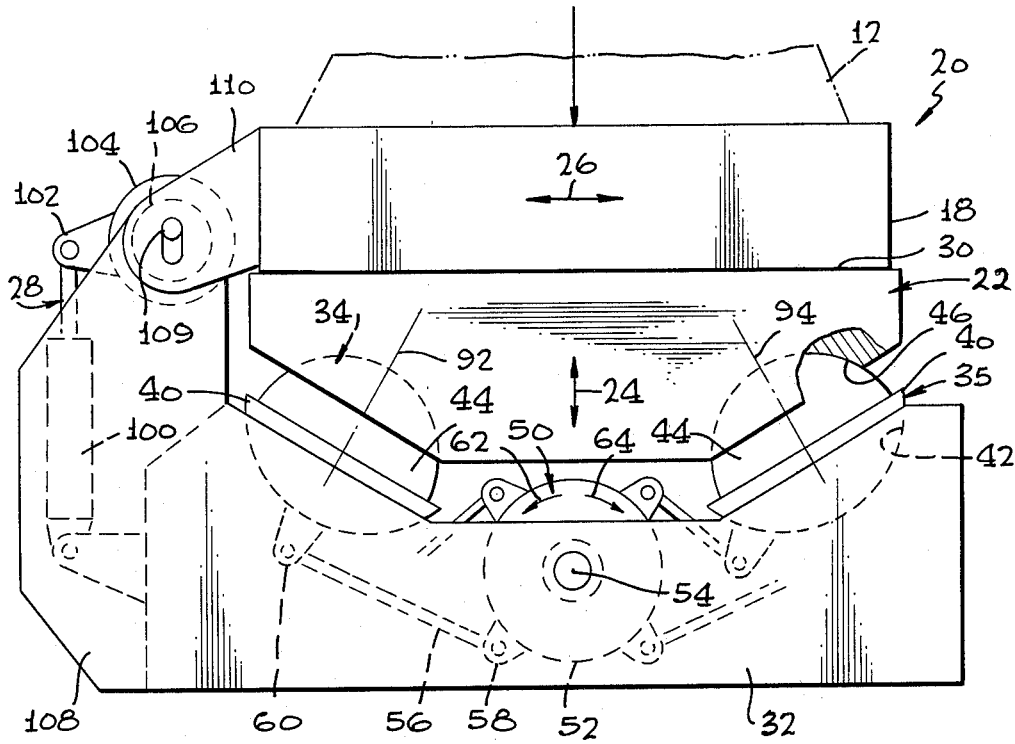
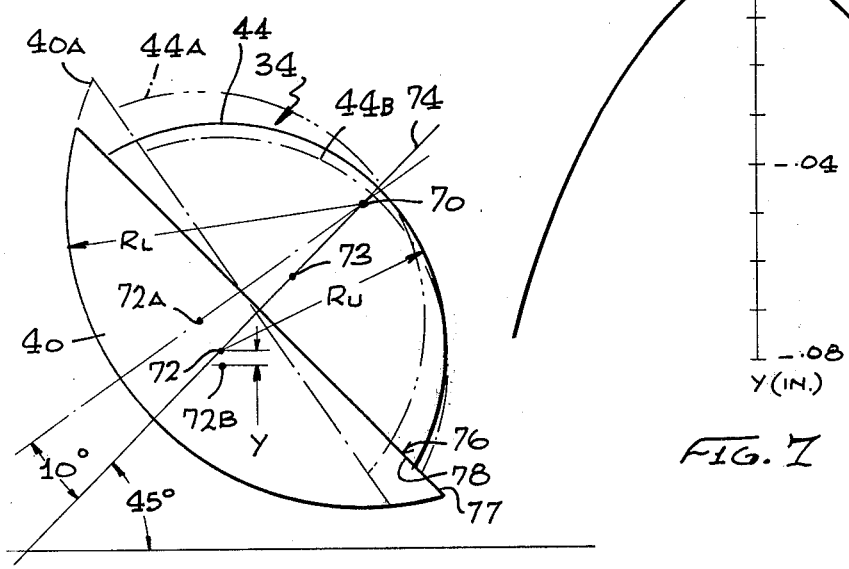

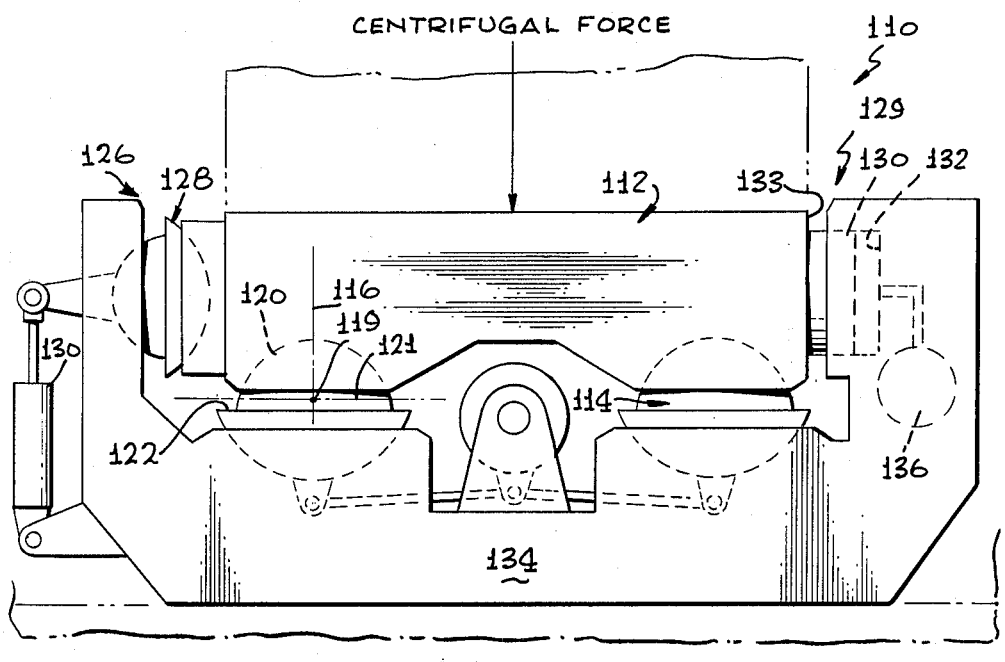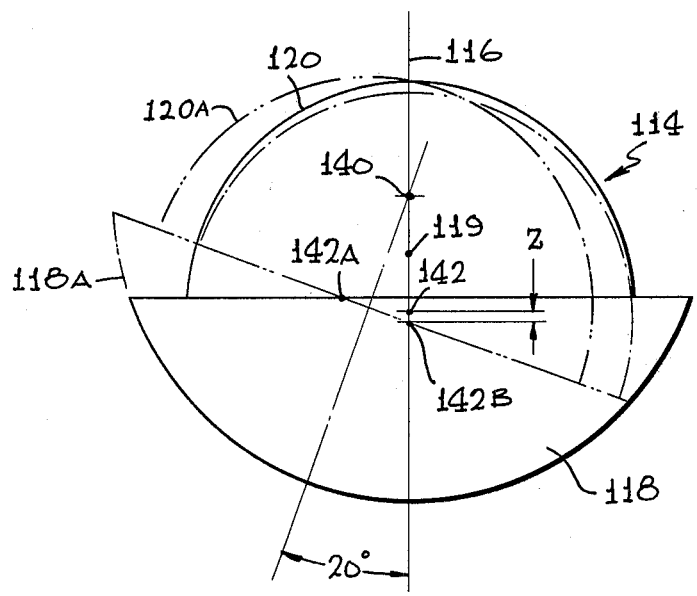

COMPACT SHAKE MECHANISM

BACKGROUND OF THE INVENTION

One technique for reproducing soil pressure distributions of large structures such as dams and buildings, is to use a scale model which is mounted on the bucket of a centrifuge. The model is subjected to an inertial, or gravity-like force inversely proportional to the scale of the model. It is often desirable to also reproduce dynamic disturbances of the model, such as those which represent earthquakes. The scaling laws require that the acceleration of the model be multiplied by the scale factor, and the displacement to be divided by it. For example, a 1:100 scale model which is to represent a real acceleration of 0.5 g (g is free-fall acceleration at sea level due to gravity) and a peak-to-peak displacement of 5 inches, would be simulated at an acceleration of 50 g and an amplitude of 0.05 inch.

Where a heavy model of a weight such as 1,000 pounds or more is used, and is subjected to a constant acceleration of 100 g in a centrifuge, it is difficult to provide a driving mechanism that can also fit in the centrifuge bucket and which can apply the required large acceleration levels to the model and withstand the large static loading. Furthermore, driver components of a size to produce the large forces for such accelerations, are likely to be more flexible than is desirable for the precise transmission of excitations of small amplitude such as 0.05 inch. A driving mechanism of relatively small size and weight, which could apply large forces over small distances, would be of considerable value in accelerating such scale models as well as in other applications where such activation is required.

SUMMARY OF THE INVENTION

In accordance with one embodiment of the present invention, a mechanism is provided for moving a driven member relative to a base, with large accelerations over small displacements, which is of relatively small size. The mechanism includes a pad device having a first pad with a circular segment received in a socket on the base, and a second pad with a circular segment received in a socket on the driven member. The centers of curvature of the two pads are displaced from one another, and the two pads are slidable on one another. An actuating device is connected to the first pad to pivot it, which causes rotation and sliding of the second pad, to thereby cause displacement of the driven member. The actuating device which pivots the first pad, can apply a moderate force over a moderate distance, to produce a large force over a small distance on the driven member.

The novel features of the invention are set forth with particularity in the appended claims. The invention will be best understood from the following description when read in conjunction with the accompanying drawings.

BRIEF DESCRIPTION OF THE DRAWINGS

FIG. 3 is an end elevation view of the actuator mechanism of FIG. 2.

FIG. 4 is a diagrammatic view showing the manner of operation of the pad devices of the mechanism of FIG. 3.

FIG. 7 is a graph showing the relationship between tilting and vertical displacement of the pad device of FIG. 4.

FIG. 8 is an end elevation view of an actuator mechanism constructed in accordance with another embodiment of the invention.

FIG. 9 is a schematic view of a pad device of the mechanism of FIG. 8, showing its manner of operation.

DESCRIPTION OF THE PREFERRED EMBODIMENTS

Figure 1:
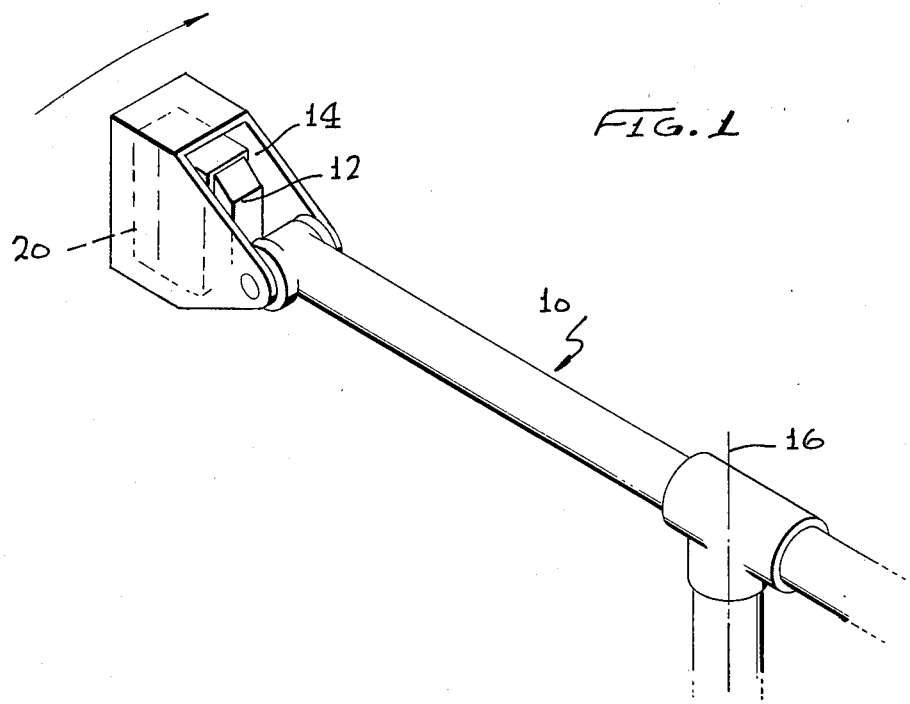
FIG. 1 is a partial perspective view of a centrifuge which utilizes the actuator mechanism of the present invention.
Figure 2:
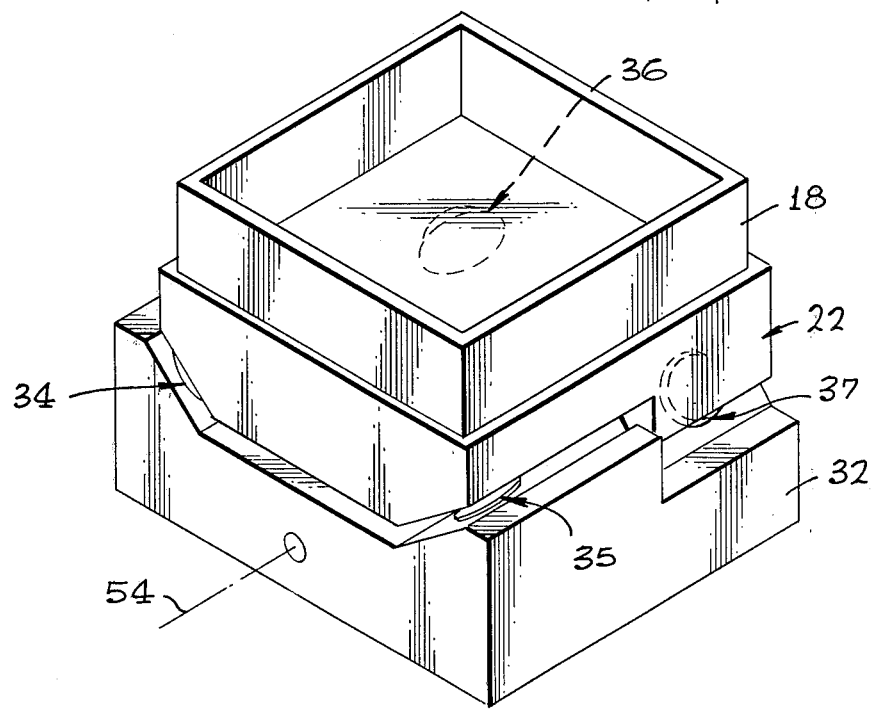
FIG. 2 is a perspective view of the actuator mechanism utilized in the system of FIG. 1.

FIG. 1 illustrates a system 10 utilized to test a geotechnical model 12 held in a bucket 14, by rotating the bucket about an axis 16 to create large centrifugal forces on the model. The model may be of a dam or building or a quantity of soil, at a scale such as 1 to 100, and the centrifugal forces are made proportional to the scaling so that forces such as 100 g or more may be applied to the model. While the systems can reproduce soil pressure distributions, it is often desirable to reproduce dynamic disturbances such as earthquakes. The scaling laws in such seismic simulations preserve the velocities of the real disturbance. As a result, the accelerations are multiplied by the scale factor and the displacements are divided by it. For example, with a 1:100 scale model, a real acceleration of 0.5 g and a peak-to-peak displacement of 5 inches would be simulated by an acceleration of 50 g and an amplitude of 0.05 inch. Frequencies are multiplied by the scale factor and time is divided by it, so that a real seismic shock for the above model with a harmonic component of 1 Hz lasting for 30 seconds, would be simulated as a frequency of 100 Hz for 0.3 seconds.

Present supports and actuators for shake tables are difficult to utilize in a centrifuge bucket to move a scale model, where simulated vertical oscillations (which are actually toward and away from the axis of rotation on a centrifuge and are usually horizontal) must be applied. This is because common actuators such as hydraulic types of moderate size, cannot accurately apply very large forces accurately over very small distances, especially where there is very high static loading in the centrifuge.

FIG. 3 shows some details of the mechanism 20 which can be utilized to move a model or specimen 12 over small and precisely controlled distances, but with large forces, to produce large accelerations over those small distances, and which also can support large static loading. The mechanism includes a driven member or platform 22 which is driven in the simulated vertical direction 24 by the mechanism, with the platform supporting the specimen basket 18 on which the model 12 lies. It should be noted that the basket 18 can move in the lateral direction 26, by the use of an auxiliary actuator device 28 together with a hydrostatic bearing indicated at 30 which allows the basket 18 to slide laterally with respect to the platform 22.

The mechanism 20 which produces the simulated vertical oscillations 24, includes a base 32 which carries four pad devices 34–37. Each pad device includes a lower or base pad 40 of almost hemispherical shape, which is closely but pivotally received in a corresponding socket 42 in the base, and an upper or driven member pad 44 of almost hemispherical shape, which is closely pivotally received in a corresponding socket 46 of the driven member or platform 22. The two pads 40, 44 have flat surfaces in contact with one another, and can freely slide along the surfaces.

The pad devices such as 34 are forced to pivot back and forth by a pivoting actuator device 50 that includes a rigid cylinder or torque tube 52 which can pivot about an axis 54 on the base, and which is joined through a link 56 to the pad device 34. The link is connected at its ends to a lug 58 on the torque tube 50 and another lug 60 on the lower pad 40 of the pad device. The torque tube is driven to oscillate along the directions of arrows 62, 64, which causes all four pad devices 34–37 to oscillate, to thereby cause the platform 22 to move in the simulated vertical direction 24.

FIG. 4 is a simplified view of the pad device 34, showing how pivoting of the device can cause vertical movement of the platform. It is assumed that the pad device is initially in the position shown in solid lines. The particular pad device 34 includes a lower pad 40 whose outer surface is part of a sphere with its center at the position 70, and with the radius of curvature $R_L$ being four inches. The pad device is assumed to rotate about an axis perpendicular to the drawing and passing through the point 70. The upper pad 44 is part of another sphere having its center initially at the point 72 and having a radius of curvature $R_U$ of three inches. A point 73 between the centers of curvature determined by the radii and by the subtended angles, may be considered the center of the pad device. In the view of FIG. 4, the lower pad 40 extends by an angle of 120° about its center 70, while the upper pad 44 extends by an angle of 150° about its center 72. In the initial position, an imaginary line 74 connecting the centers of curvature extends at a selected angle such as 45° from the simulated horizontal.

When the lower pad 40 is forced to pivot by 10° about the axis 70 from the position 40 to the position 40A, it forces the upper pad 44 to also pivot. If the pads did not slide on one another, the pad 44 would move to the position 44A, wherein its center of rotation moved from 72 to the position 72A. In that case, the socket on the platform which receives the upper pad 44 would move upward and to the left in the drawing of FIG. 4, the center of the socket moving from the position 72 to the position 72A. However, since the upper pad 44 can slide, and since its center cannot move laterally in the drawing, because the other pad devices do not allow lateral movement, the upper pad at 44A would have to slide along the lower pad 40A until its center moved from 72A to the position 72B. The final upper pad position at 44B is lower than the initial position 72 by a distance Y. For the above example, wherein the lower pad has been rotated by 10°, the distance Y by which the platform has moved down, will be about 0.07 inch. This occurs where the pad interface 76 (where the pad bearing faces 77, 78 bear on one another) is flat and perpendicular to the line 74 that connects the centers of curvature. It is possible to utilize a curved interface.

While the link 56 (FIG. 3) may move about ¾ inch to pivot the lower pad 40 by 10°, this results in a vertical platform movement of about 1/10th as much. As a result, the movement of the platform is reduced by 1/10th, while the force that must be applied through the link 56 to move the platform is only about 1/10th the force applied to the platform. An actuator (82 in FIG. 5) coupled to another lug on the torque tube 50 to pivot it, therefore can apply a moderate stroke length such as 0.7 inch at a moderate force level, to move the platform 22 accurately along a vertical distance of 0.07 inch. Also, much larger forces can be applied to the platform than are applied by the actuator to the torque tube, to rapidly accelerate the platform.

FIG. 7 shows the relationship between the angle of pivoting of the lower pad 40 of FIG. 4 away from its initial 45° incline, and the resulting vertical displacement Y. For moderate pivoting of up to about 10° on either side of the initial position, the corresponding vertical displacement Y is fairly close to a sinusoid, although with an appreciable second harmonic.

Figure 5:
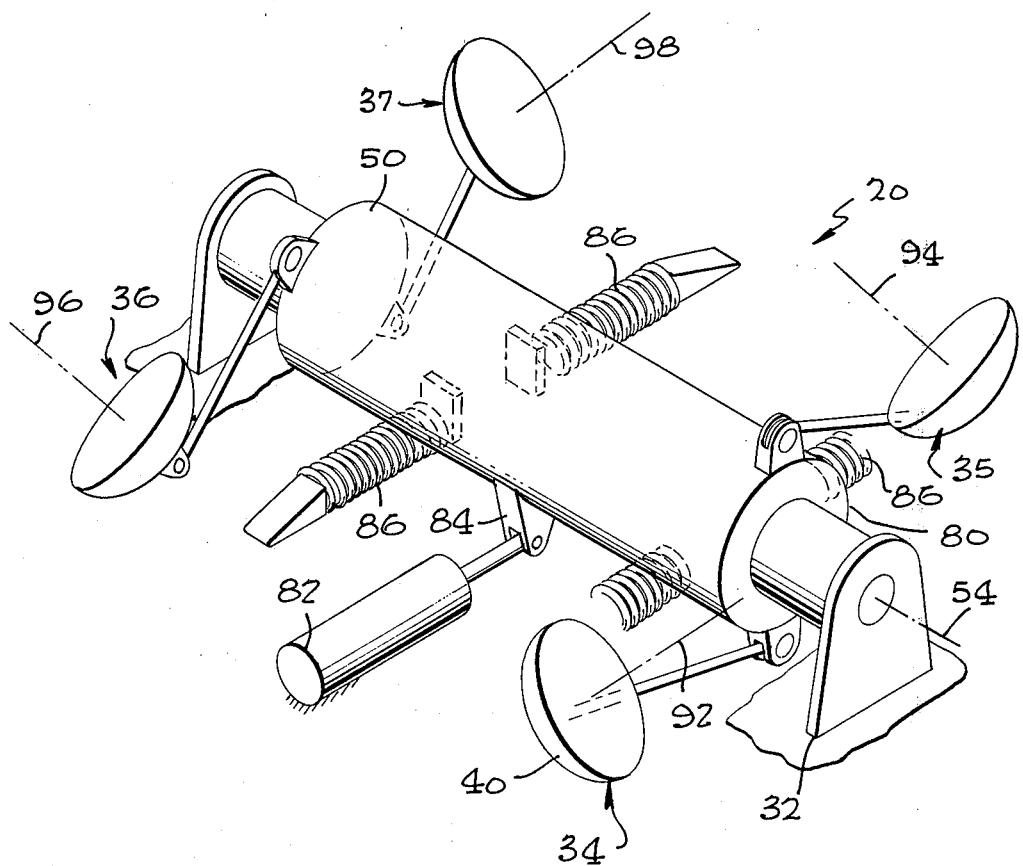
FIG. 5 is a partial perspective view of the mechanism of FIG. 3.
Figure 6:
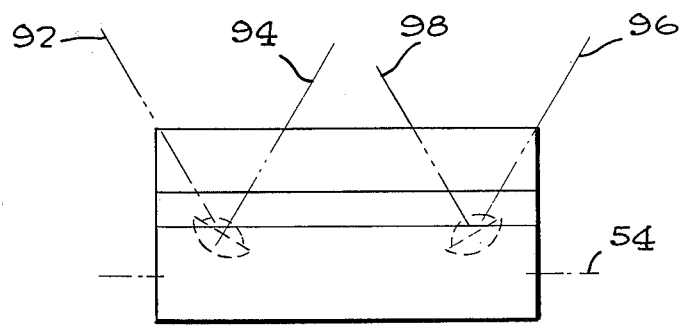
FIG. 6 is a diagrammatic side elevation view of the mechanism of FIG. 3.

FIG. 5 shows the arrangement of various parts of the moving mechanism 20 of FIG. 3, and showing the four pad devices 34–37 but with only the lower pads 40 thereof. The torque tube 50 has a shaft 80 that is rotatably supported on the base, and is oscillated in rotation by a hydraulic actuator 82. The actuator has a piston connected to a driver lug 84 on the torque tube, and an opposite end connected to the base by a coupling (not shown). The torque tube is maintained in a center position by heavy-duty centering springs 86. The springs 86 can be pretensioned to resist most of the force on the table 22 caused by the centrifugal force. In order to resist lateral motion of the platform, each of the four pad devices are oriented in a different manner. The lower pads of the first two pad devices 34, 35 which lie on opposite sides of a longitudinal centerline coincident with axis 54, are angled towards one another as seen in the end elevation view of FIG. 3, wherein the axes 92, 94 of the pad devices 34, 35 appear to converge along an upward direction. As seen in FIG. 5, the axes 96, 98 of the last two pad devices 36, 37 which also lie on opposite sides of the longitudinal centerline 54, diverge along an upward direction. In addition, the two axes 92, 96 diverge in an upward direction as seen in a side view (FIG. 6) while the two axes 94, 98 converge in an upward direction in the same view. This stabilizes the platform 22 against lateral movement.

The lateral actuator 28 shown in FIG. 3, which moves the basket 18 laterally, includes a hydraulic actuator 100. The actuator 100 moves a lug 102 on another torque tube 104 that is rotatably mounted by a shaft 106 on mounting flanges 108 extending from the base. The shafts 106 carry eccentrics 109 which can rotate in holes of flanges 110 on the basket 18. When the hydraulic actuator 100 moves up and down, the eccentrics 109 move the specimen basket 18 laterally along the direction of arrows 26.

FIG. 8 illustrates another moving system 110 for moving a platform 112, where a group of four pad devices 114 that move the platform vertically are not used to control lateral platform position; other means are provided to control lateral movement of the platform. Each pad device 114 is substantially the same as the pad devices of the apparatus of FIG. 4, except that the axis 116 of each pad device oscillates about a position that is substantially vertical instead of tilted. That is, the centers 119 of the pad devices lie on imaginary plane 121, and the axis 116 of the pad devices extend normal to this plane. The upper pad 120 can slide along the flat interface 122 of the upper and lower pads. The vertical orientation of the pad axis 116 at the central pad position, results in symmetrical movement of the platform 112 for excursions on either side of its central position.

As a result, the higher harmonics of the sinusoidal vertical oscillations are reduced to a very low level and the second harmonic predominates. In addition, the sliding interface at 122 of the upper pads on the lower ones, provides bearings for supporting the platform 112 in lateral motion, to avoid the need for a separate hydrostatic bearing for this purpose.

The system 110 includes an additional lateral actuator device 126 which has a pad device 128 similar to those utilized for vertical movement of the platform. The pad device 128 is pivoted by a separate actuator 130 which, in the present case, pivots the smaller of the two pads. It would be possible to utilize four such pad devices 128 to control the position and produce oscillations of the plaform 112 in each of the two lateral directions, except that a biasing means would also be required to hold such lateral-actuating pad devices firmly against the platform. Such a biased device can be provided by utilizing a biasing piston 130 which lies in a shallow cylinder 132 of the base 134, and which is pressurized by an accumulator 136. The pressure in the accumulator 136 resiliently biases the platform 112 against the opposite pad device 128. The platform 112 can slide up and down relative to the piston 130 at a sliding interface 133. Two of such biasing devices 129 can be provided, at spaced positions opposite the lateral actuator 127. Additional bearings prevent lateral platform movement into or out of the drawing of FIG. 8.

FIG. 9 shows how the pad device 114 can operate to move the platform 112 up and down as the lower pad 118 is pivoted. In order to aid illustration it is assumed that the lower pad 118 has been tilted by 20° about its axis of pivoting 140, to the position 118A. If the upper pad 120 could not slide on the lower pad, its center of rotation would move from the position 142 to the position 142A, so that the upper pad would move to the position 120A. However, if the platform is held in the same lateral position, the upper pad would slide along the lower one, until this center of curvature of the upper pad moved down to the position 142B. As a result, the center of curvature of the upper pad would have moved down by the distance Z. Of course, pivoting and sliding of the upper pad actually occur simultaneously. It may be noted that if the platform and upper pads 120 move laterally while the upper pads are tilted, there is some vertical movement of each upper pad. This can be taken into account in adjusting the relative phases and amplitudes of the actuators.

Thus, the invention provides a system for moving a driven member such as a platform, which provides large amplification of force and large division of motion between the actuator and the driven member, with precise control of driven member movement and with the capacity to support large static loads on the driven member such as those produced by a centrifuge. This is accomplished by the utilization of a pad device which includes two pads which may be referred to as the upper and lower pads, that have circular sections as seen in a cross-sectional view and that have adjacent faces that can slide on one another. The centers of rotation of the upper and lower pads are displaced from one another, so that rotation of one of the pads in a socket causes rotation and sliding of the other pad relative to the first one. This results in a small but precisely controlled movement of the upper pad and the platform or other driven member in which it is socketed, relative to the lower one. A group of such pad devices can be utilized to move a platform located on a centrifuge, a small distance towards and away from the center of the centrifuge, but with very high accelerations, while the pad devices also support the large centrifugal loading of the platform and a model thereon. While the driving mechanism is especially useful to shake a platform in testing models, it could be used in any application (e.g. pile driving) where small but large force movements are required.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. Apparatus for moving a driven member comprising:
   a base having a base socket;
   a driven member having a driven member socket facing said base socket;
   a pad device having a base pad with a bearing surface defining part of a first circle and which is closely received in said base socket, and having a driven member pad with a bearing surface defining part of a second circle and which is closely received in said driven member socket, the centers of curvature of said circular bearing surfaces being spaced apart, and said pads having bearing faces which bear on each other and which allow the pads to slide on one another; and
   means of pivoting said pad device whereby to move said driven member relative to said base.

2. The apparatus described in claim 1 including:
   three additional pad devices, said base and driven member forming four pairs of sockets lying substantially at the four corners of an imaginary rectangle, and said first mentioned and three additional pad devices lying at said four corners; and
   said means for pivoting is connected to all four of said pad devices to pivot them.

3. The apparatus described in claim 2 wherein:
   said base has an imaginary longitudinal centerline, a first pair of said pad devices lie on a first side of said centerline and a second pair of said pad devices lie on a second side thereof; and
   the centers of curvature of the first and and second circles of each pad device are connected by an imaginary connecting line that forms an axis of the pad device, and the axes of all four pad devices are angled from said imaginary plane when viewed along said centerline, with axes on opposite sides of said centerline angled from each other when viewed along said centerline.

4. Moving apparatus comprising:
   a base and a platform, each having sockets including a first pair of sockets lying on a first side of an imaginary base longitudinal centerline and a second pair lying on a second side thereof;
   four pad devices, each including a pair of pads with substantially circular surfaces that have centers of curvature that are spaced from each other, and with the pads having an interface along which they can slide relative to one another, one pad of each device received in a base socket and the other pad received in a corresponding platform socket; and
   means for rotably oscillating said pad devices.

5. The apparatus described in claim 4 wherein:

the centers of said pad devices lie substantially on an imaginary plane, and said oscillating means oscillates said pad devices about positions wherein an imaginary axis of each pad device which passes through the centers of curvature of the two pads thereof, is substantially normal to said plane.

6. The apparatus described in claim 4 wherein: each of said pads has a surface which is part of a sphere and whose cross-section forms said circular surface.

7. The apparatus described in claim 4 including: a centrifuge having an arm which rotates about a predetermined axis, and said base is supported on an end of said arm with the centers of all pad devices lying substantially on an imaginary plane which is normal to a radius from said axis of rotation of said arm.

* * * * *